US008568942B2

(12) United States Patent
Ito et al.

(10) Patent No.: US 8,568,942 B2
(45) Date of Patent: Oct. 29, 2013

(54) GAS DIFFUSION ELECTRODE, METHOD FOR MANUFACTURING THE SAME AND MEMBRANE ELECTRODE ASSEMBLY

(75) Inventors: Makoto Ito, Nagoya (JP); Hirokazu Ishimaru, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 834 days.

(21) Appl. No.: 12/440,292

(22) PCT Filed: Sep. 4, 2007

(86) PCT No.: PCT/JP2007/067234
§ 371 (c)(1),
(2), (4) Date: May 18, 2010

(87) PCT Pub. No.: WO2008/029811
PCT Pub. Date: Mar. 13, 2008

(65) Prior Publication Data
US 2010/0233568 A1 Sep. 16, 2010

(30) Foreign Application Priority Data

Sep. 7, 2006 (JP) ................................. 2006-243457

(51) Int. Cl.
*H01M 4/00* (2006.01)
(52) U.S. Cl.
USPC ........................................................ 429/523
(58) Field of Classification Search
None
See application file for complete search history.

(56) References Cited

U.S. PATENT DOCUMENTS

| 6,884,539 | B2 | 4/2005 | Eshraghi | |
|---|---|---|---|---|
| 7,645,399 | B2 * | 1/2010 | Tarnawskyj et al. | 252/510 |
| 2003/0087145 | A1 * | 5/2003 | Yasumoto et al. | 429/44 |
| 2004/0018430 | A1 * | 1/2004 | Holman et al. | 429/233 |
| 2004/0131934 | A1 * | 7/2004 | Sugnaux et al. | 429/209 |
| 2007/0212604 | A1 * | 9/2007 | Ovshinsky et al. | 429/210 |
| 2009/0017354 | A1 * | 1/2009 | Yano et al. | 429/27 |

FOREIGN PATENT DOCUMENTS

| JP | 7-105957 | 4/1995 |
|---|---|---|
| JP | 8-7897 | 1/1996 |
| JP | 2000-513480 | 10/2000 |
| JP | 2001-84831 | 3/2001 |
| JP | 2001084831 A * | 3/2001 |
| JP | 2001-338656 | 12/2001 |
| JP | 2003-323897 | 11/2003 |
| JP | 2004-119072 | 4/2004 |
| JP | 2005-85594 | 3/2005 |
| JP | 2005-149745 | 6/2005 |
| JP | 2006-12569 | 1/2006 |
| WO | WO 2004/059764 A1 | 7/2004 |
| WO | WO 2004/067637 A1 | 8/2004 |

OTHER PUBLICATIONS

Machine Translation of JP2006-012569A.*
Reasons for Rejection for JP Appl. No. 2006-243457 dated Nov. 27, 2011.

* cited by examiner

*Primary Examiner* — Patrick Ryan
*Assistant Examiner* — Wyatt McConnell
(74) *Attorney, Agent, or Firm* — Finnegan, Henderson, Farabow, Garrett & Dunner, LLP

(57) ABSTRACT

A porous gas diffusion electrode provided on a polymer electrolyte such that a gas can be introduced, for a polymer electrolyte fuel cell, includes a carbon fiber, and an electric conductive polymer and a thermoset resin that bond the carbon fibers to each other.

8 Claims, 2 Drawing Sheets

GAS DIFFUSION ELECTRODE, METHOD FOR MANUFACTURING THE SAME AND MEMBRANE ELECTRODE ASSEMBLY

CROSS-REFERENCE TO RELATED APPLICATION

This application is a national phase application of International Application No. PCT/JP2007/067234, filed Sep. 4, 2007, and claims the priority of Japanese Application No. 2006-243457, filed Sep. 7, 2006, the contents of both of which are incorporated herein by reference.

TECHNICAL FIELD

The present invention relates to a gas diffusion electrode for a polymer electrolyte fuel cell, a method for manufacturing the same and a membrane electrode assembly which is provided with the same.

BACKGROUND ART

Fuel cells are electrochemical devices that directly convert chemical energy in fuels into electric energy, and in the fuel cells the fuels of reductants such as reformed hydrogen manufactured from hydrogen, methanol or fossil fuel are electrochemically oxidized by oxidants such as air or oxygen. They draw attention recently and are expected to be "clean" or relatively little pollutant producing sources of electric energy that provide power in higher conversion efficiency than internal engines with superiority in stillness and generating lower pollutant such as $NO_x$, $SO_x$ and particulate matter (PM) causing air pollution. They are, for instance, expected to operate in replacement of power systems of the conventional automobiles, and as thermal and electric power providing systems and dispersed electric power sources for such as residences.

The most common classification of fuel cells is by the type of electrolyte used in the cells and includes alkaline fuel cell (AFC), phosphoric acid fuel cell (PAFC), molten carbonate fuel cell (MCFC), solid oxide fuel cell (SOFC) and polymer electrolyte fuel cell (PEFC). The PAFC and PEFC using proton conductivity electrolyte can operate at high efficiency without suffering the thermodynamic limitation by Carnot cycle, and it attains the theoretical efficiency of 83% at the temperature of 25° C. The PEFC, especially, attract attention because they are useful for power sources for lower pollutant automobiles and high efficiency power generating systems, with improvement in its performance by recent development in electrolyte membrane and catalyst technologies.

The PEFC has a structure which is provided with a planar or cylindrical, for example, polymer electrolyte layer and a gas diffusion electrode on each side of the polymer electrolyte layer, a catalyst layer being therebetween on each side, and that kind of the structure is called a membrane electrode assembly (MEA) and the conventional PEFC is constituted of a plurality of the MEAs stacked and separators disposed therebetween. Through the aforementioned gas diffusion electrode, fuel gas and air reach the surfaces of the electrolyte layer and the catalyst layer, and the electrode is required to have superiority in gas diffusiveness and electric conductivity for obtaining the generated electric current. Carbon fiber paper (namely, carbon paper) is generally used for conventional gas diffusion electrodes. Instead, suggested are, for example, carbon fiber cloth (namely, carbon cloth, disclosed, for instance, in Patent Document 1), unwoven fabrics including carbon nanofiber and/or carbon nanocone (disclosed, for instance, in Patent Document 3), or unwoven fabrics impregnated with conductive material (disclosed, for instance, in Patent Document 4).

Patent Document 1: JP 07-105957 A
Patent Document 2: JP 08-007897 A
Patent Document 3: JP 2005-149745 A
Patent Document 4: JP 2000-513480 A

DISCLOSURE OF THE INVENTION

Object Achieved by the Invention

The carbon fiber paper is manufactured by adding a binder such as polyvinyl alcohol and cellulose to form a paper, impregnating the paper with phenol resin and curing it, and burning the paper in the nitrogen mood at around 2000° C. in the burning treatment to carbonize the resin. Such carbon fiber paper is superior both in electric conductivity and gas diffusiveness, however, it costs remarkably expense for manufacturing due to need to burn in the nitrogen mood at around 2000° C. of a high temperature. Also it is a disadvantage that the carbon fiber paper is difficult to handle because it is hard and fragile due to its constitution, made of carbon in whole, and difficult to apply to non-planar fuel cells, such as cylindrical fuel cells. For these reasons, the aforementioned characteristics of the carbon fiber paper impede practical use despite its advantage that the cylindrical fuel cells require no separator or gasket.

The carbon fiber cloth is made by weaving carbon fibers. Such carbon fiber cloth is superior in electric conductivity in the traverse direction, that is, longitudinal direction of the fibers, however, inferior in the thick direction because the fibers are merely contact with each other. And it is difficult to utilize for such as the cylindrical fuel cell because, although the carbon fiber cloth is softer than the carbon fiber paper, it is not so soft for close contact with the electrolyte layer of the fuel cell other than planar one. It is suggested a similar means, that is, an electrode in which short carbon fibers and carbon particles are tangled, made by rubbing carbon black on carbon cloth, sticking on the electrolyte via the catalyst layer, pressing by hot pressing and tearing it off. (For instance, disclosed in Patent Document 2)

The aforementioned unwoven fabrics including carbon nanofiber and/or carbon nanocone is manufactured by mixing carbon nanofiber and/or carbon nanocone and such as organic polymer, drying and forming a paper. It, however, has disadvantages that carbon nanofiber and carbon nanocone are inferior in diffusiveness upon mixing with such as organic polymer due to their fineness, and they causes manufacturing of unwoven fabrics at considerable cost due to their expensiveness. Furthermore, it has another disadvantage of increasing in electric resistance due to bonding by such as organic polymer.

The aforementioned unwoven fabrics impregnated with conductive material is made of unwoven fabrics including carbon fibers that are impregnated with high electric conductive metal. In general, however, reactions in PEFCs generate hydrogen peroxide. Hydrogen peroxide reacts with metals to generate OH radicals that may damage the polymer electrolyte layers. For this reason, metals are not used by degrees in PEFCs.

It is therefore an object of the present invention to provide a gas diffusion electrode superior in electric conductivity and in mechanical strength, available for a cylindrical fuel cell and provided at low cost, a method for manufacturing the same and an MEA provided with it.

Means for Solving the Problem

The object indicated above may be achieved according to the first mode of the invention, which provides a porous gas diffusion electrode provided on a polymer electrolyte such that a gas can be introduced, for a polymer electrolyte fuel cell, characterized in comprising (a) a carbon fiber, and an electric conductive polymer and a thermoset resin that bond the carbon fibers to each other.

The object indicated above may be achieved according to the second mode of the invention, which provides a method for manufacturing a porous gas diffusion electrode provided on a polymer electrolyte such that a gas can be introduced, for a polymer electrolyte fuel cell, characterized in comprising steps for (a) preparing a slurry for an electrode including a carbon fiber, an electric conductive polymer, a thermoset resin and a solvent, (b) applying the slurry for an electrode onto the polymer electrolyte, and (c) drying the applied slurry for an electrode in a drying treatment to cure the thermoset resin.

The object indicated above may be achieved according to the third mode of the invention, which provides a method for manufacturing a porous gas diffusion electrode provided on a polymer electrolyte such that a gas can be introduced, for a polymer electrolyte fuel cell, characterized in comprising steps for (a) preparing a slurry for an electrode including a carbon fiber, an electric conductive polymer and a solvent, (b) forming a sheet product including a thermoset resin using the slurry for an electrode, and (c) drying the sheet product in a drying treatment to cure the thermoset resin.

The object indicated above may be achieved according to the fourth mode of the invention, which provides a membrane electrode assembly, comprising a polymer electrolyte layer, catalyst layers formed on each surface of the polymer electrolyte layer, and gas diffusion electrodes of the first mode of the invention, formed on the respective surfaces of the catalyst layers.

Advantages of the Invention

According to the first mode of the invention, the gas diffusion electrode is sufficiently superior in electric conductivity due to mutual bonding of carbon fibers by electric conductive polymer. And the gas diffusion electrode is also sufficiently superior in mechanical strength due to mutual bonding of carbon fibers by thermoset resin. Consequently, the gas diffusion electrode superior both in electric conductivity and mechanical strength can be provided because electric conductive polymer contributes to achieving high electric conductivity and thermoset resin contributes to achieving high mechanical strength. According to the first mode of the invention, thermoset resin contributes to achieving high mechanical strength because thermoset resin is not carbonated and constitutes the gas diffusion electrode in itself. The conventional carbon fiber papers remarkably reduce in mechanical strength by carbonating due to achieving high electric conductivity by bonding carbon fibers with such as thermoset resin upon making a paper and carbonating the thermoset resin. As compared to it, for the gas diffusion electrode according to the first mode of the invention, it is not necessary to carbonate the thermoset resin due to achieving high electric conductivity by electric conductive polymer.

Furthermore, no need to carbonate the thermoset resin causes no need to burn at a high temperature in the nitrogen mood for carbonating thermoset resin upon forming the gas diffusion electrode. This provides an advantage that manufacturing at low cost can be achieved in comparison to that using the carbon fiber papers requiring the burning treatment because the heating treatment only for drying to cure thermoset resin is required.

The temperature about equal to the cure temperature of thermoset resin causes no effects in its quality on such as the polymer electrolyte layer and catalyst constituting the MEA, and, if it causes any effect, little damage in characteristics is given on the PEFC. The gas diffusion electrode may be formed by applying slurry including carbon fibers, electric conductive polymer and thermoset resin onto the polymer electrolyte layer and curing it. Accordingly, it is available for such as cylindrical PEFCs, that is, non-planar ones, due to no limitation in its shape for the polymer electrolyte while the gas diffusion electrode of carbon fiber paper requires limitation. The gas diffusion electrode according to the first mode of the invention that is previously formed into a sheet is also superior in mechanical strength and flexibility, depending upon the kind and amount of the thermoset resin, as compared to the conventional carbon fiber paper that is formed of the carbonated thermoset resin, since the electrode is formed only by curing the thermoset resin. The sheet formed electrode is available for both planar and cylindrical PEFCs. Consequently, the gas diffusion electrode that is superior in electric conductivity and available for cylindrical fuel cells can be provided at low cost.

The thermoset resin may directly or indirectly, that is, in the state that it covers the electric conductive polymer with, bond carbon fibers, and, as advantages, it causes the directly bonded portion further superior in its strength, and the indirectly bonded portion further superior in its strength and in water resistance because the electric conductive polymer is not disclosed.

In the description for the gas diffusion electrode according to the first mode of the invention, the words "on the electrolyte" means both the states that the gas diffusion electrode is directly formed on the polymer electrolyte and that the gas diffusion electrode is formed on another layer(s) such as the catalyst layer that is formed on the polymer electrolyte.

According to the second mode of the invention, the gas diffusion electrode is manufactured by preparing slurry for the electrode including carbon fibers, electric conductive polymer, thermoset resin and a solvent in the slurry preparing step, applying the slurry onto the polymer electrolyte in the applying step, and drying it in the drying step. That is, this gas diffusion electrode can be manufactured by drying for curing instead of by carbonating the thermoset resin in the burning step. This provides the gas diffusion electrode superior in electric conductivity because the carbon fibers are mutually bonded by the electric conductive polymer according to the ratio for mixing of the electric conductive polymer and thermoset resin. Thus, the gas diffusion electrode is superior in mechanical strength due to directly or indirectly (that is, as covering the electric conductive polymer, or via it) mutual bonding of carbon fibers by thermoset resin according to the above mixing ratio. Consequently, the gas diffusion electrode superior both in electric conductivity and mechanical strength can be provided because electric conductive polymer contributes to achieving high electric conductivity and thermoset resin contributes to achieving high mechanical strength. This easily provides the gas diffusion electrode according to the first mode of the invention.

The second mode of the invention contributes to exclude limitation in shape for the polymer electrolyte derived from use of such as carbon fiber paper previously made, because the gas diffusion electrode is formed by directly applying of the slurry onto the polymer electrolyte. Accordingly, it is an advantage that it is preferably available for constituting the planar or other shape such as cylindrical fuel cells.

According to the third mode of the invention, the sheet gas diffusion electrode is manufactured by preparing slurry for the electrode including carbon fibers, electric conductive polymer and a solvent in the slurry preparing step, forming a sheet product including thermoset resin using the slurry in the forming step, and drying it in the drying step. That is, this gas diffusion electrode can be manufactured by drying for curing instead of by carbonating the thermoset resin in the burning step. This provides the gas diffusion electrode superior in electric conductivity because the carbon fibers are mutually bonded by the electric conductive polymer according to the ratio of the electric conductive polymer and thermoset resin. Thus, the gas diffusion electrode is superior in mechanical strength due to directly or indirectly (that is, as covering the electric conductive polymer, or via it) mutual bonding of carbon fibers by thermoset resin according to the above ratio. Consequently, the gas diffusion electrode superior both in electric conductivity and mechanical strength can be provided because electric conductive polymer contributes to achieving high electric conductivity and thermoset resin contributes to achieving high mechanical strength. This easily provides the gas diffusion electrode according to the first mode of the invention.

The third mode of the invention provides the sheet gas diffusion electrode as well as the conventional carbon fiber paper, however, the gas diffusion electrode according to the third mode of the invention is superior in flexibility because the thermoset resin is cured by drying, as compared to one made of the carbonated thermoset resin in the burning treatment as well as the carbon fiber paper. Accordingly, it is an advantage that it is preferably available for constituting the planar or other shape such as cylindrical fuel cells.

The third mode of the invention may provide the sheet product including thermoset resin by adding thermoset resin in any desired phase. For instance, as in the above second mode of the invention, it may be added with such as electric conductive polymer upon preparing the slurry for the electrode. Or, the sheet product may be impregnated with thermoset resin after the sheet product is formed using slurry for the electrode that does not include thermoset resin. The former provides an advantage of easy manufacturing process. The latter provides a gas diffusion electrode further superior in electric conductivity as an advantage, and superior also in mechanical strength about equal to one according to the second mode of the invention, because the carbon fibers are bonded mainly by electric conductive polymer in the sheet forming step, and then, the electric conductive polymer is to be covered with thermoset resin.

The fourth mode of the invention provides the MEA provided with the gas diffusion electrode superior in electric conductivity and mechanical strength, since the MEA is made by forming the gas diffusion electrode on one and another surfaces of the polymer electrolyte layer via catalyst layers.

Preferably, it may be provided the gas diffusion electrode according to the first mode of the invention, wherein a predetermined slurry for an electrode is provided on the polymer electrolyte by dip coating. The gas diffusion electrode according to the first mode of the invention may, for instance, be manufactured in the method for manufacturing the gas diffusion electrode according to the second mode of the invention. This provides desirableness in shape of the electrode as compared to one using the sheet gas diffusion electrode.

Preferably, in the first to fourth modes of the invention, the aforementioned electric conductive polymer is non-water soluble. This provides an advantage that damages in the electric conductive polymer and reduction in electric conductivity may be avoidable even when the gas diffusion electrode is disclosed to water or water vapor provided or generated in use of the PEFC. The words "non-water soluble" means that it has resistance to water such that it can maintain the original prepared quality for a certain measure of time (for instance, around one to thirty days) when the slurry for the electrode is prepared by using electric conductive polymer diffused in water.

Preferably, in the first to fourth modes of the invention, the aforementioned electric conductive polymer is polyethylene dioxythiophene. This provides a gas diffusion electrode further superior in electric conductivity because polyethylene dioxythiophene is especially superior in electric conductivity in the group of electric conductive polymers. Any electric conductive polymer is available for that in the first to fourth modes of the invention, proper one selected from the groups of such as polvthiophene-based and polyaniline-based is available and one selected from the polvthiophene-based group is especially preferable because the polymer superior in electric conductivity is preferable if possible. The electric conductive polymer is not necessarily required to be superior in water resistance because it is protected by thermoset resin in a degree, however, usually it cannot be perfectly covered. Therefore, superior water resistance is required for it if possible, and the polymer selected from the polythiophene-based group, especially, polyethylene dioxythiophene is preferable.

In regard to the ratio, 5-20 parts in weight of the aforementioned electric conductive polymer are preferable with respect to 100 parts in weight of carbon fibers. Sufficiently low resistance is provided by 5 or more parts in weight of the polymer, and sufficiently high gas permeation is provided by 20 or less parts in weight of the polymer. High gas permeation is preferable, and, for instance, about 24 parts in weight of the electric conductive polymer cause the gas permeation of only 17 ml·mm/(min·cm$^2$·kPa).

Preferably, it may be provided the gas diffusion electrode according to the first mode of the invention, comprising a high boiling point solvent of which boiling point is higher than a cure temperature of the thermoset resin. This provides further superior in electric conductivity for the gas diffusion electrode for unknown reason. The high boiling point solvent functions also as a plasticizer in the case of preparing the slurry for the electrode as in the second or third mode of the invention in order to form the gas diffusion electrode. Any high boiling point solvent is available, an aprotic polar solvent, such as ethylene glycol, N-methyl-2-pyrrolidone, dimethyl sulfoxide and diisopropyl benzene, is preferable. The words "(a) boiling point is higher than a cure temperature" means that it cannot be volatilized in the drying treatment for curing the thermoset resin, and the solvent having the boiling point of about 180-190° C. is preferable.

In the first to three modes of the invention, the PEFC is preferably provided with catalyst on the three phase interface on which reactions occur. The catalyst is, for instance, laminatedly provided between the polymer electrolyte layer and gas diffusion electrode. Or the catalyst may be provided to be loaded in the gas diffusion electrode and supported by carbon fibers or carbon particles. It can be loaded in the gas diffusion electrode, for instance, by impregnating slurry including catalyst after the gas diffusion electrode is formed, or by loading catalyst at the same time when forming the gas diffusion electrode using slurry for the electrode including the catalyst.

In the first to fourth modes of the invention, any kind of carbon fibers such as polyacrylonitrile-based carbon fibers, pitch-based carbon fibers or rayon-based carbon fibers are available. The gas diffusion electrode with using polyacrylonitrile-based carbon fibers is especially superior in mechanical strength because the carbon fibers are superior in strength. The gas diffusion electrode with using pitch-based carbon fibers is especially superior in electric conductivity.

In the first to fourth modes of the invention, the aforementioned carbon fibers have preferably 10-20 μm in average diameter. The carbon fibers having 10 μm or longer in average diameter are sufficiently superior in mechanical strength due to their sufficient thickness and difficulty to be broken. The carbon fibers having 20 μm or shorter in average diameter are facilitated to be mixed with electric conductive polymer or a solvent. Furthermore, the carbon fibers having 20 μm or shorter in average diameter are facilitated to be manufactured.

In the first to fourth modes of the invention, the aforementioned carbon fibers have preferably 50-200 μm in average length. The carbon fibers having 50 μm or longer in average length are sufficiently superior in mechanical strength due to their sufficiently mutual tangling. The carbon fibers having 200 μm or shorter in average length are sufficiently superior in diffusiveness and in equality for the composition of the gas diffusion electrode. Although even the carbon fibers having 200 μm in average length can become sufficiently superior in diffusiveness by using a dispersant, use of a dispersant is not preferable in point of electric conductivity and gas diffusiveness.

In the first to fourth modes of the invention, any resin such as phenol resin, epoxy resin, melanin resin or silicone resin is available for the aforementioned thermoset resin. Proper resin is selected from these resins according to its purpose in view of such as heat resistance, mechanical strength and flexibility, and phenol resin is especially preferable, for instance, in point of mechanical strength and heat resistance.

In regard to the ratio, 0.5-2.0 parts in weight of the thermoset resin are preferable with respect to 100 parts in weight of carbon fibers. The thermoset resin is the component for ensuring mechanical strength and water resistance in the gas diffusion electrode, and it is not electrically conductive in itself and used for filling the voids in the gas diffusion electrode. Therefore, 0.5 parts in weight or more of the thermoset resin are preferable for sufficient superiority in such as mechanical strength and water resistance in the gas diffusion electrode. And 2.0 parts in weight or less of the thermoset resin are preferable for sufficient superiority in gas permeation and electric conductivity in the gas diffusion electrode.

In the first to fourth modes of the invention, the aforementioned gas diffusion electrode preferably includes water repellent. This causes further superiority in water resistance and water vapor resistance due to restraint of water and water vapor that contact the gas diffusion electrode to invade its interior. For instance, polytetrafluoroethylene (PTFE) is available for the water repellent.

The PEFC is provided with the gas diffusion electrode on each side, that is, on the fuel electrode side and the air electrode side, and the electrode according to the first to fourth modes of the invention can be used for any on the fuel electrode side or the air electrode side. It is, however, not required to provide the same structure of the electrode on both side, any proper structure of the electrode may be provided according to such as the desired characteristics and convenience in manufacturing, and only one of the electrodes on both sides may be the electrode according to the first to fourth modes of the invention.

The first to fourth modes of the invention may be provided in various kinds of PEFCs using various kinds of polymer electrolytes, and any proper material is available for the polymer electrolyte. They may be, for instance, homopolymer or copolymer of monomer having an ion exchange group (such as —$SO_3H$ group), copolymer of mononer having an ion exchange group and another monomer capable of copolymerizing with the former monomer, homopolymer of monomer having a functional group that may be converted to an ion exchange group in a post treatment such as hydrolysis (namely, a precursory functional group of an ion exchange group), and copolymer (proton conductive polymer precursor) that is treated in the same post treatment.

And the following materials may be, for instance, available for the polymer electrolyte: perfluoro type proton conductive polymer such as perfluorocarbonsulfonic acid resin; perfluorocarboncarboxylic acid resin membranes; sulfonic acid type polystyrene-graft-etylenetetrafluoroetylene (ETFE) copolymer membranes; sulfonic acid type poly (trifluorostyrene)-graft-ETFE copolymer membranes; polyetheretherketone (PEEK) sulfonic acid membranes; 2-acrylamide-2-methylpropanesulfonic acid (ATBS) membranes; and hydrocarbon membranes.

NOMENCLATURE OF ELEMENTS

10: MEA, 12: Electrolyte membrane, 14, 16: Catalyst layers, 18, 20: Gas diffusion electrodes, 30: MEA, 32: Gas diffusion electrode, 34: Catalyst layer, 36: Electrolyte membrane, 38: Catalyst layer, 40: Gas diffusion electrode

BEST MODE FOR CARRYING OUT THE INVENTION

Hereinafter, there will be described embodiments of the present invention by reference to the drawings. The figures are appropriately simplified or transformed, and all the proportion of the dimension and the shape of a portion or member may not be reflective of the real one in the following embodiments.

Figure 1:
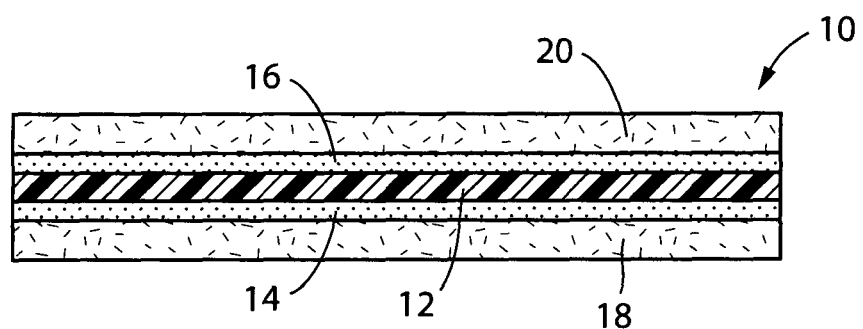
FIG. 1 illustrates a planar MEA according to an embodiment of the present invention.

FIG. 1 illustrates a plate type of MEA 10 in a cross sectional view according to an embodiment of the present invention. The MEA 10 includes a thin layer of an electrolyte membrane 12 that expands as a plate, catalyst layers 14, 16 that are respectively disposed on each surface of the electrolyte membrane 12, and gas diffusion electrodes 18, 20 that are respectively disposed on each surface of the catalyst layers 14, 16 as shown in FIG. 1.

The electrolyte membrane 12 is made of electrolyte having proton conductivity, such as DuPont™ Nafion® membranes, and, for instance, has the thickness of about 200 μm.

The catalyst layers 14, 16 are made of, for instance, platinum (Pt) loading carbon black that is constituted of spherical carbon powder loaded with catalyst such as platinum. It is provided by, for instance, Tanaka Kikinzoku Kogyo K.K. The catalyst layers 14, 16 have the thickness of, for instance, about 50 μm.

The gas diffusion electrodes 18, 20 are porous layers that respectively have the thickness of, for instance, about 100 μM, and they allow gas to easily permeate through them between the outwardly facing surfaces and the opposite surfaces of them (that is, the surfaces on the sides of the catalyst layer 14, 16).

These gas diffusion electrodes 18, 20 are made of such as carbon fibers, electric conductive polymer, thermoset resin, a water repellent and a solvent. The carbon fibers are, for instance, about 10-20 μm in diameter and about 50-200 μm in length. The electric conductive polymer is made of such as polyethylene dioxythiophene. The thermoset resin is made of, for instance, phenol resin. The water repellent is, for instance, PTFE. The solvent is, for instance, ethylene glycol, a high boiling point solvent, having a boiling point of about 190° C. that is sufficiently higher than the cure temperature, about 120° C., of thermoset resin.

In the gas diffusion electrodes 18, 20, carbon fibers are tangled with each other, and bonded each other by electric conductive polymer and thermoset resin at the contact points. At one point they are bonded by only electric conductive polymer, at another point they are bonded by electric conductive polymer and further the polymer is covered with thermoset resin, and at further another point they are bonded by only thermoset resin. There are portions where carbon fibers are bonded by the electric conductive polymer over the whole gas diffusion electrodes 18, 20, and accordingly, the gas diffusion electrodes 18, 20 have high electric conductivity, that is, for instance, about 0.02Ω·cm of volume resistance both in the thickness and surface directions.

At the point where the electric conductive polymer is covered with thermoset resin, the polymer that is insufficient in water resistance and water vapor resistance is protected from water and water vapor. Accordingly, water resistance and water vapor resistance of the gas diffusion electrodes 18, 20 are improved. At the point where carbon fibers are directly bonded by only thermoset resin, the gas diffusion electrodes 18, 20 are inferior in electric conductivity, however, the electrodes 18, 20 are improved in mechanical strength because that kind of bonding causes superiority in mechanical strength.

The aforementioned planar gas diffusion electrodes 18, 20 are manufactured, for instance, in the following steps. First, carbon fibers, electric conductive polymer, thermoset resin, PTFE, and a solvent, for instance, water or alcohol are prepared. For example, 100 parts in weight of carbon fibers, 5-20 parts in weight of electric conductive polymer, 0.3-1.0 parts in weight of thermoset resin, 5-15 parts in weight of PTFE, 20-30 parts in weight of ethylene glycol and 600-700 parts in weight of the solvent are to be mixed.

Next, all the aforementioned materials in a proper container are mixed and stirred, for instance, by a stirrer for about an hour in a preliminary mixing step. And it is treated in an ultrasonic dispersion treatment in a dispersing step, for instance, for about thirty minutes. It is stirred again, for instance, by a stirrer to prepare slurry for an electrode in a mixing step, for instance, for about thirty minutes. In the mixing step, it is preferable to weakly stir so as not to damage carbon fibers. Then, it is not preferable to strongly stir by such as a ball mill. The dispersing step and the mixing step last, for instance, for about an hour in total.

Next, in a membrane manufacturing step, the prepared slurry is applied to both the surfaces of the electrolyte membrane 12 that is already provided with the catalyst layers 14, 16 to manufacture layers on it. The application is achieved, for instance, by brushing or dip coating. Since a simple planar MEA 10 is manufactured in this embodiment, it may be manufactured in the conventional sheet forming process such as a doctor blade process. After sheet forming, the obtained sheet electrode is bonded to the electrolyte membrane 12 in thermocompression bonding under a pressure of about 500 kPa. In this case, for instance, catalyst is applied to the sheet electrode to form the catalyst layer, and it is disposed with the catalyst layer facing to the electrolyte membrane 12 side as almost overlapped, and treated in the thermocompression bonding.

Next, in a drying step, it is dried at a predetermined temperature ranging 120-180° C. that is determined according to the kind of thermoset resin for about five hours, to cause the thermoset resin hardened to provide the gas diffusion electrodes 18, 20 that are superior in mechanical strength. Since the electric conductive polymer is decomposed at a higher temperature than the aforementioned temperature, the kind of the electric conductive polymer should be determined in consideration for the decomposition temperature of the electric conductive polymer.

Figure 2:
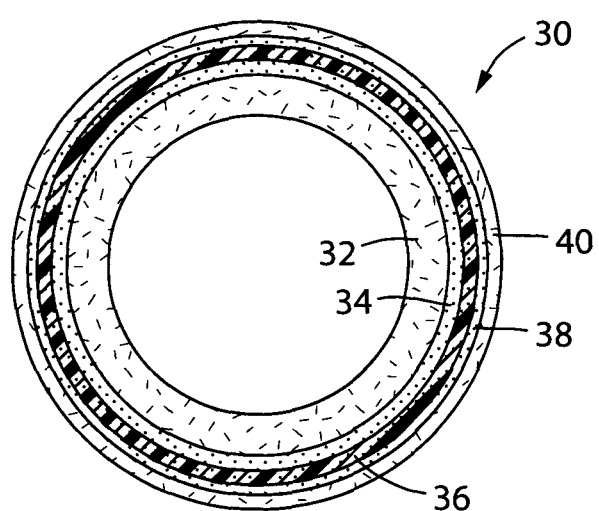
FIG. 2 illustrates a cylindrical MEA according to another embodiment of the present invention.

FIG. 2 illustrates the cylindrical MEA 30 of another embodiment according to the present invention in a sectional view that is cut along a direction perpendicular to the axial direction of the MEA 30. As shown in FIG. 2 the MEA 30 is provided with a gas diffusion electrode 32 at the innermost in the axial direction, a catalyst layer 34, an electrolyte membrane 36, a catalyst layer 38 and a gas diffusion electrode 40.

The aforementioned gas diffusion electrode 32 is formed by impregnating a cylindrical base material, for instance, constituted of porous metal or carbon and having open ends or an open and a closed ends, with the aforementioned components for the gas diffusion electrodes 18, 20, and it has the dimensions of, for instance, about 1 mm in inner diameter and about 2 mm in outer diameter.

The aforementioned catalyst layers 34, 38 is formed of, for instance, platinum loading carbon black and have about 50 μm in thickness. That is, they are formed in the same manner as the catalyst layers 14, 16 other than the shape, cylindrical one.

The aforementioned electrolyte membrane 36 is made of electrolyte having proton conductivity, such as DuPont™ Nafion® membranes, and, for instance, has the thickness of about 200 μm. That is, the cylindrical electrolyte membrane 36 is made of the same material as that of the electrolyte membrane 12.

The gas diffusion electrode 40 at the outermost in the radial direction has about 100 μm in thickness, and it is a porous layer through which gas can easily permeate between its outer surface and its inner surface (that is, the surface on the side of the catalyst layer 38). The gas diffusion electrode 40 is made of such as carbon fibers, electric conductive polymer, thermoset resin, a water repellent and a solvent. That is, it is formed in the same manner as the gas diffusion electrodes 18, other than the shape, cylindrical one.

In the aforementioned gas diffusion electrode 32 that is different from the gas diffusion electrodes 18, 20 in its shape and structure, carbon fibers on the surface and the opposite surface and in the pores of the base material are bonded with each other by electric conductive polymer and thermoset resin as well as in the gas diffusion electrodes 18, 20. The gas diffusion electrode 40 is also formed in the same manner as the gas diffusion electrodes 18, 20 other than its shape. Accordingly, both are superior in electric conductivity caused by fibers bonded by electric conductive polymer and in mechanical strength caused by fibers bonded by thermoset resin.

The aforementioned MEA 30 is manufactured in the following steps. In addition to the same components as those for the MEA 10, porous base material for constituting the gas diffusion electrode 32 is required.

First, slurry for the electrode is prepared in the same steps as the aforementioned dispersing and mixing steps. Next, the porous base material is, for instance, dipped into the slurry for the electrode to be coated with the slurry for the electrode on at least one of its outer surface and inner surface, and dried in a drying treatment to have the gas diffusion electrode 32.

And catalyst slurry is prepared by, for instance, dispersing catalyst powder in a proper electrolyte polymer solution, the outer surface of the aforementioned gas diffusion electrode 32 is coated with the catalyst slurry by, for instance, dipping the electrode 32 into the catalyst slurry, and dried in a drying treatment to form the catalyst layer 34.

The outer surface on which the catalyst layer 34 is provided is coated with an electrolyte polymer solution by, for instance, dipping it into the solution, and dried in a drying treatment to form the electrolyte membrane 36. The aforementioned electrolyte polymer solution is a polymer solution having proton conductivity, such as Nafion® membranes.

The catalyst layer 38 is formed on the outer surface of the electrolyte membrane 36 by, for instance, dipping into the catalyst slurry used for forming the aforementioned catalyst layer 34. Although any of organic and water solvents can be used for forming the catalyst layer 34, water solvent should be used in this step in order to prevent damages on the electrolyte membrane 36 by the solvent.

The gas diffusion electrode 40 is formed on the outer surface of the catalyst layer 38 by, for instance, dipping into the slurry for the electrode, and dried in a drying treatment, to complete the MEA 30.

As described above, the drying treatment to cure the thermoset resin in the gas diffusion electrodes 18, 20, 32, 40 is required, instead of sintering treatment, for forming both of the planar and cylindrical MEA. It causes facilitation in manufacturing steps and, accordingly, lower cost manufacturing as an advantage, comparing to the conventional steps in which carbon fiber papers made of carbonated thermoset resin in the sintering treatment are used.

It also provides an advantage that the gas diffusion electrodes 18, 20, 32, 40 is superior in electric conductivity due to mutual tangling of carbon fibers instead of carbon spheres, and in air permeation due to large voids between fibers. Table 1 shows examples in characteristics for electrodes in the present embodiment and a comparative test in which carbon spheres are used. In these tests, carbon fibers have about 150 µm in length, polyethylene dioxythiophene is used for the electric conductive polymer in both tests and phenol resin is used for the thermoset resin.

TABLE 1

|  | Embodiment | Comparative |
|---|---|---|
| Air Permeation (ml · mm/(min · cm$^2$ · kPa)) | 170 | 5 |
| Volume Resistance (Ω · cm) | 0.02 | 83 |

Figure 3:
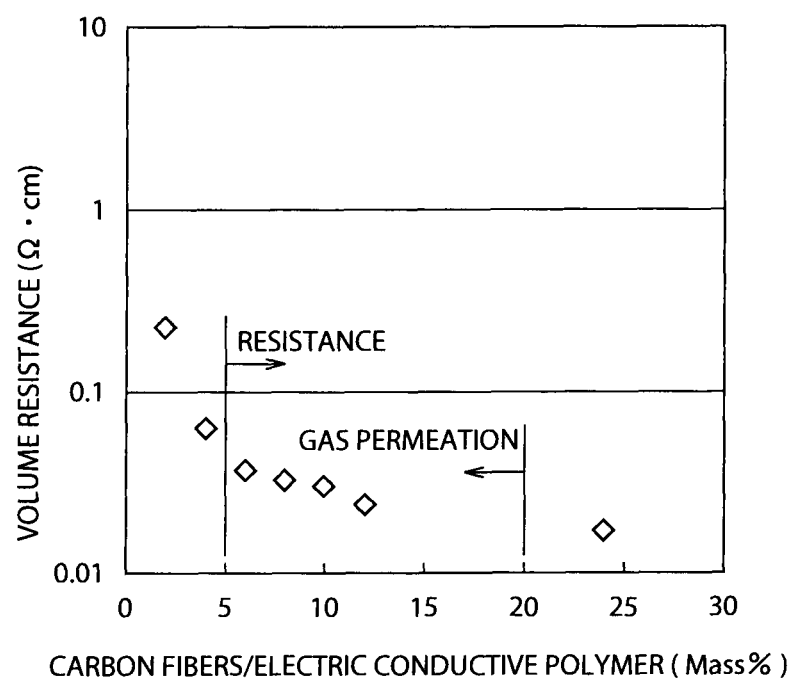
FIG. 3 is a graph showing the relationship between the content of the electric conductive polymer and the resistance for a gas diffusion electrode according to an embodiment of the present invention.

FIG. 3 shows the relationship between the content of the electric conductive polymer and the volume resistance of the gas diffusion electrode. In these tests, 100 parts in weight of carbon fibers, 0-24 parts in weight of electric conductive polymer, 0.5 parts in weight of thermoset resin, 10 parts in weight of PTFE, 25 parts in weight of ethylene glycol and 600 parts in weight of the solvent were mixed. In FIG. 3 plotted are the results of measurement, in the four-terminal method, of the resistance for the membrane made by drying the slurry having the aforementioned contents. The graph indicates the resistance of about 0.3Ω·cm at 2 parts in weight and the resistance of about 0.07Ω·cm at 4 parts in weight, and, accordingly, it is inferred that 5 parts in weight or more is preferable for sufficient electric conductivity. And since the graph says that the gas permeation reduces with an increase in the amount of the content, it is inferred that 20 parts in weight or less is preferable.

Although the results are not shown in the tables or graph, it was found that 200 µm or shorter in length of the carbon fibers was preferable after measurements with various lengths of the carbon fibers. For instance, carbon fibers of about 150 µm causes the gas diffusion electrode superior in homogeneity, however, carbon fibers of about 230 µm causes the gas diffusion electrode tending to have lumps of carbon fibers. And carbon fibers of 50 µm or longer in length are preferable because of remarkable reduction in gas permeation when the length of carbon fibers is below 50 µm.

Also the effect caused by the content of thermoset resin was tested. Although thermoset resin is required for increases in mechanical strength and water repellency, excessive thermoset resin causes insufficiency in gas permeation. Furthermore, it causes reduction in electric conductivity due to its insulation characteristics. Of course, low volume resistance is preferable, however, $10^{-1}$Ω·cm or below is sufficient. Table 2 shows measurement results of sufficiently low volume resistance of about 0.02Ω·cm and sufficient high gas permeation of about 170 ml·mm/(min·cm$^2$·kPa) at 0.5 parts in weight of thermoset resin. It also shows sufficiently low volume resistance of about 0.08Ω·cm, and available but low gas permeation of about 64 ml·mm/(min·cm$^2$·kPa) at 2.0 parts in weight of thermoset resin. These tests say that below 2.0 parts in weight of thermoset resin is preferable.

TABLE 2

| Thermoset Resin (Parts in Weight) | Volume Resistance (Ω · cm) | Gas Permeation (ml · mm/(min · cm$^2$ · kPa)) |
|---|---|---|
| 0.5 | 0.02 | 170 |
| 2.0 | 0.08 | 64 |

Embodiment 1

The following are the further concrete descriptions for embodiments. In this embodiment, the slurry for the electrode was prepared by the preliminary mixing for about an hour, the ultrasonic dispersion for about thirty minutes and mixing by the stirrer for about thirty minutes. The content of each component is determined as follows: 100 parts in weight of carbon fibers; 10 parts in weight of polyethylene dioxythiophene; 0.5 parts in weight of phenol resin; 8 parts in weight of PTFE; 33 parts in weight of ethylene glycol; and 670 parts in weight of 2-propanol (the solvent).

The slurry for the electrode prepared in the aforementioned manner was applied, for instance, by brushing, onto such as the catalyst layer 14 formed on the electrolyte membrane 12 or 36. Then it is dried in the drying treatment at about 150° C. for about five hours to be the MEA.

The following Table 3 shows the results in a characteristics evaluation test for the gas diffusion electrode for the MEA in the Embodiment 1 as a single membrane. Electric conductivity was measured in the four-terminal method in the surface direction. The resistance in the thickness direction was not measured, however, it is inferred to be equal in view of its structure. The gas permeation was measured with being pressurized under a pressure of 50 kPa. The volume of pores was measured in the mercury injection method. The average flow diameter almost corresponds to the pore size in the gas diffusion electrode and it was measured by the pore size measuring device. The Young's modulus and tensile strength were measured by the universal material test device.

TABLE 3

| Electric Conductivity | 0.02 Ω · cm |
|---|---|
| Gas Permeation | 170 ml · mm/(min · cm$^2$ · kPa) |
| Volume of Pores | 82% |
| Average Flow Diameter | 14.5 μm |
| Young's Modulus | 72 MPa |
| Tensile Strength | 3.0 N/cm |

As the above results show, Embodiment 1 can provide the mechanically strong gas diffusion electrode superior in electric conductivity and gas permeation.

And in the following described is the effects of thermoset resin on the gas diffusion electrode in water resistance and water vapor resistance. In the test, water resistance is evaluated by whether the membrane (gas diffusion electrode) in the beaker after stirred is soluble. The membrane including no thermoset resin was dissolved at 25° C. in about thirty minutes. On the other hand, the membrane including thermoset resin according to the present embodiment remained at 80° C. for eight hours. In the test for water vapor resistance, the membrane according to the present embodiment quite remained at 90° C. and 80% in humidity.

Embodiment 2

In this embodiment, the slurry for the electrode was prepared by the preliminary mixing to mix carbon fibers, electric conductive polymer and plasticizer for about an hour, the ultrasonic dispersion for about thirty minutes and mixing by the stirrer for about thirty minutes. The content of each component in this Embodiment 2 is determined as follows: 100 parts in weight of carbon fibers; 9.2 parts in weight of polyaniline; 35 parts in weight of ethylene glycol; and 650 parts in weight of the solvent (denatured alcohol).

Next, a sheet product was formed from the aforementioned slurry, for instance, in a doctor blade process. The sheet product was dried at 120° C. for about three hours in the drying treatment, and impregnated with thermoset resin in the vacuum impregnation treatment. The vacuum impregnation causes easy impregnation of resin into inner portions of the sheet. And the impregnated product was dried, for instance, at 150° C. for about three hours in the drying treatment. The sheet product just after formed is insufficient in strength and water resistance, and it can increase in strength thus by impregnation of thermoset resin into pores, and at the same time, increase in water resistance by the electric conductive polymer covered with thermoset resin. Epoxy resin is available for the thermoset resin. The sheet product was impregnated for five minutes in the 5% solution. Further, the gas diffusion electrode is obtained by vacuum impregnation in PTFE, and drying for about three hours in the drying treatment. The vacuum impregnation in FE continued for three minutes using a 15% solution.

The characteristics of the obtained gas diffusion electrode are shown in the following Table 4. The measured results can be regarded as similar values to those in Embodiment 1, and it can be concluded that similar results can be obtained both in directly applying the slurry for the electrode and in sheet forming. For this structure, evaluation for water resistance is not performed, however, it is apparent that the characteristics are satisfactory in view of the structure in Embodiment 1.

TABLE 4

| Electric Conductivity | 0.035 Ω · cm |
|---|---|
| Gas Permeation | 171 ml · mm/(min · cm$^2$ · kPa) |
| Volume of Pores | 81.2% |
| Average Flow Diameter | 14.2 μm |
| Young's Modulus | 78 MPa |
| Tensile Strength | 3.3 N/cm |

It is to be understood that the present invention may be embodied with other changes, improvements, and modifications that may occur to a person skilled in the art without departing from the scope and spirit of the invention defined in the appended claims.

The invention claimed is:

1. A porous gas diffusion electrode provided on a polymer electrolyte such that a gas can be introduced, for a polymer electrolyte fuel cell, comprising:
    a carbon fiber;
    an electric conductive polymer and a thermoset resin that bond the carbon fibers to each other; and
    a high boiling point solvent having a boiling point higher than a cure temperature of the thermoset resin.

2. The gas diffusion electrode of claim 1, wherein a predetermined slurry for an electrode is provided on the polymer electrolyte by dip coating.

3. The gas diffusion electrode of claim 1, wherein the electric conductive polymer is polyethylene dioxythiophene.

4. A method for manufacturing a porous gas diffusion electrode provided on a polymer electrolyte such that a gas can be introduced, for a polymer electrolyte fuel cell, comprising steps for:
    preparing a slurry for an electrode including a carbon fiber, an electric conductive polymer, a thermoset resin and a high boiling point solvent having a boiling point higher than a cure temperature of the thermoset resin;
    applying the slurry for an electrode onto the polymer electrolyte; and
    drying the applied slurry for an electrode in a drying treatment to cure the thermoset resin.

5. A method for manufacturing a porous gas diffusion electrode provided on a polymer electrolyte such that a gas can be introduced, for a polymer electrolyte fuel cell, comprising steps for:
    preparing a slurry for an electrode including a carbon fiber, an electric conductive polymer and a high boiling point solvent having a boiling point higher than a cure temperature of a thermoset resin;
    forming a sheet product including the thermoset resin using the slurry for an electrode; and
    drying the sheet product in a drying treatment to cure the thermoset resin.

6. A membrane electrode assembly, comprising:
    a polymer electrolyte layer;
    catalyst layers formed on each surface of the polymer electrolyte layer; and
    gas diffusion electrodes of claim 1 formed on the respective surfaces of the catalyst layers.

7. A membrane electrode assembly, comprising:
    a polymer electrolyte layer;
    catalyst layers formed on each surface of the polymer electrolyte layer; and
    gas diffusion electrodes of claim 2 formed on the respective surfaces of the catalyst layers.

8. A membrane electrode assembly, comprising:
a polymer electrolyte layer;
catalyst layers formed on each surface of the polymer electrolyte layer; and
gas diffusion electrodes of claim 3 formed on the respective surfaces of the catalyst layers.

* * * * *